(12) United States Patent
Ooenoki et al.

(10) Patent No.: US 6,298,152 B1
(45) Date of Patent: *Oct. 2, 2001

(54) IMAGE RECOGNITION SYSTEM USING LIGHT-SECTION METHOD

(75) Inventors: Toshiyuki Ooenoki; Toshiro Ootani, both of Hirakata (JP)

(73) Assignee: Komatsu Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/117,389
(22) PCT Filed: Jan. 10, 1997
(86) PCT No.: PCT/JP97/00060
    § 371 Date: Jul. 29, 1998
    § 102(e) Date: Jul. 29, 1998
(87) PCT Pub. No.: WO97/31240
    PCT Pub. Date: Aug. 28, 1997

(30) Foreign Application Priority Data

Aug. 20, 1996 (JP) .................................................. 8-032387

(51) Int. Cl.⁷ .................................................. G06K 9/00
(52) U.S. Cl. .................. 382/181; 702/166; 702/167; 702/170; 702/171
(58) Field of Search .................................. 382/181, 182, 382/183, 184, 185, 108, 154; 702/166, 167, 170, 171; 356/376, 237

(56) References Cited

U.S. PATENT DOCUMENTS 5,270,780 * 12/1993 Moran ........................................ 356/5
5,756,981 * 5/1998 Roustaei et al. ...................... 235/462
5,949,056 * 9/1999 White .................................. 235/472.01

FOREIGN PATENT DOCUMENTS 58-170220  10/1983  (JP) .
61-24616   2/1986   (JP) .

* cited by examiner

Primary Examiner—Andrew W. Johns
Assistant Examiner—Seyed Azarian
(74) Attorney, Agent, or Firm—Armstrong, Westerman, Hattori, McLeland & Naughton, LLP

(57) ABSTRACT

An image recognition system using a light-section method which has versality and does not shorten the service life of light projector means. Projection of light from a light source onto a workpiece is continued between the time when a measuring command is issued and the time just after light has been converged by the automatic aperture control mechanism of a television camera. An image processing unit processes an image picked up by the television camera just after the convergence of light by the automatic aperture control mechanism so as to obtain three dimensional configuration data on the workpiece.

10 Claims, 11 Drawing Sheets

IMAGE RECOGNITION SYSTEM USING LIGHT-SECTION METHOD

BACKGROUND OF THE INVENTION

1. Field of the Invention

The present invention relates to an image recognition system using the light-section method, in which linear light is projected onto an object to be measured, to form a linear light image on the object and this image is picked up to obtain three-dimensional configuration data on the object.

2. Description of the Related Art

In an image recognition system using the light-section method, an image of linear light which has been projected onto the object by a light projector means must be accurately picked up in order to ensure improved accuracy in the recognition of the configuration of the object. In other words, picking up of a linear light image must be done so as to enable a thinning process by which the linear light is represented by a line having an infinitely small width which is normally the width of one pixel in ordinary image processing.

The image pickup means for picking up an image of an object onto which linear light is projected has a diaphragm mechanism for adjusting the amount of admitted light. If a diaphragm aperture is inappropriate, the above thinning process to express a linear light as a line of one pixel width becomes difficult. More specifically, when picking up an image of the same linear light projected onto an object, if the aperture is small, the picked-up light image becomes thick, so that variations are created in the thinning process, causing zigzag portions on the image of the linear light after thinning. On the other hand, if the aperture is large, the picked-up light image becomes thin, resulting in discontinuous portions in the image of the linear light after thinning. In both cases, the linear light cannot be represented by a line of one pixel width, which causes a defect in the image recognition of the light as a line.

To solve this problem, diaphragm aperture settings are predetermined on the basis of object conditions and illumination intensity.

Such a system, however, has little flexibility and versatility because of preliminarily fixed aperture settings according to object conditions and illumination intensity. In addition, light projection by use of a light projector means needs to be carried out at all times in order to obtain constant illumination intensity, which shortens the service life of the light projector means.

The present invention is directed to overcoming these problems and one of the objects of the invention is therefore to provide an image recognition system using the light-section method, which provides versatility and does not lead to a reduction in the service life of the light projector means.

SUMMARY OF THE INVENTION

The above object can be achieved by an image recognition system using the light-section method according to the invention, in which linear light is projected onto an object to be measured, to form a light image on the surface thereof and the light image is then picked up to obtain three dimensional data associated with the object, the system comprising:

(a) light projector means controlled to be turned ON and OFF to intermittently project a linear light onto the object;

(b) image pickup means for picking up an image of the object onto which a linear light has been projected by the light projector means, the image pickup means including an automatic aperture control mechanism for automatically adjusting diaphragm aperture according to a picked-up image;

(c) image processing means for processing an image picked up by the image pickup means to obtain three-dimensional configuration data on the object; and (d) controller means for controlling turning ON and OFF of the light projector means such that the light projector means is put in its ON state to project a linear light onto the object between the time when a measuring command is issued and the time just after light has been converged by the automatic aperture control mechanism of the image pickup means or just after a state equivalent to the convergence of light has been established, and controlling the image processing means to process an image picked up by the image pickup means just after the convergence of light by the automatic aperture control mechanism or just after the establishment of the state equivalent to the convergence of light, so as to obtain three dimensional configuration data on the object.

In the invention, firstly, the light projector means is brought into its ON-state, in response to a measuring command, to project a linear light onto an object. According to an image of the object onto which the linear light has been projected, the automatic aperture control mechanism automatically performs aperture adjustment to converge light. Based on an image picked up just after light has been converged by the aperture control or just after establishment of a state equivalent to the convergence of light, image processing for producing three-dimensional configuration data is performed and subsequently, the light projector means is turned off thereby stopping light projection.

Thus, the use of the automatic aperture control mechanism for automatically adjusting the amount of admitted light eliminates the need for fixing not only aperture settings but also object conditions and illumination intensity, which entails improved versatility. Additionally, there is no need to project light by the light projector means at all times as light projection may be carried out between the time when a measuring command has been issued and the time just after light convergence has been caused by the automatic aperture control mechanism or just after establishment of a state equivalent to light convergence. With this arrangement, shortening of the service life of the light projector means can be avoided.

Preferably, the invention further includes aperture holding means for holding the aperture at a value set upon completion of light convergence done by the automatic aperture control mechanism of the image pickup means or upon establishment of the state equivalent to light convergence, from the completion of light convergence or the establishment of the light-convergence-equivalent state until the next release of a measuring command. The provision of such aperture holding means eliminates the need for taking a large action for aperture setting, which in consequence shortens the time required for aperture adjustment operation.

The aperture holding means may be designed to cut off an actuating power source for the automatic aperture control mechanism thereby stopping its aperture adjustment operation to hold the aperture at a value set upon completion of light convergence or upon establishment of the light-convergence-equivalent state. Alternatively, the aperture holding means includes an image storage unit for storing an image picked up by the image pickup means just after light convergence or just after establishment of the lightconvergence-equivalent state, at least until the next release of a measuring command. According to this image stored in the image storage unit, the automatic aperture control mechanism performs aperture adjustment operation so as to hold the aperture at the value set upon the completion of light convergence or upon the establishment of the light-convergence-equivalent state, until the next release of a measuring command.

Preferably, the light projector means projects a linear light generated by a single wavelength light source onto the object and the image pickup means picks up the image of the object onto which the linear light has been projected, through an attenuation filter having a pass band centered at the single wavelength of the light emitted by the light source. With this arrangement, lights other than the linear light are not to be picked up so that the resulting three dimensional configuration data is highly accurate.

DETAILED DESCRIPTION OF THE PREFERRED EMBODIMENTS

Figure 1:
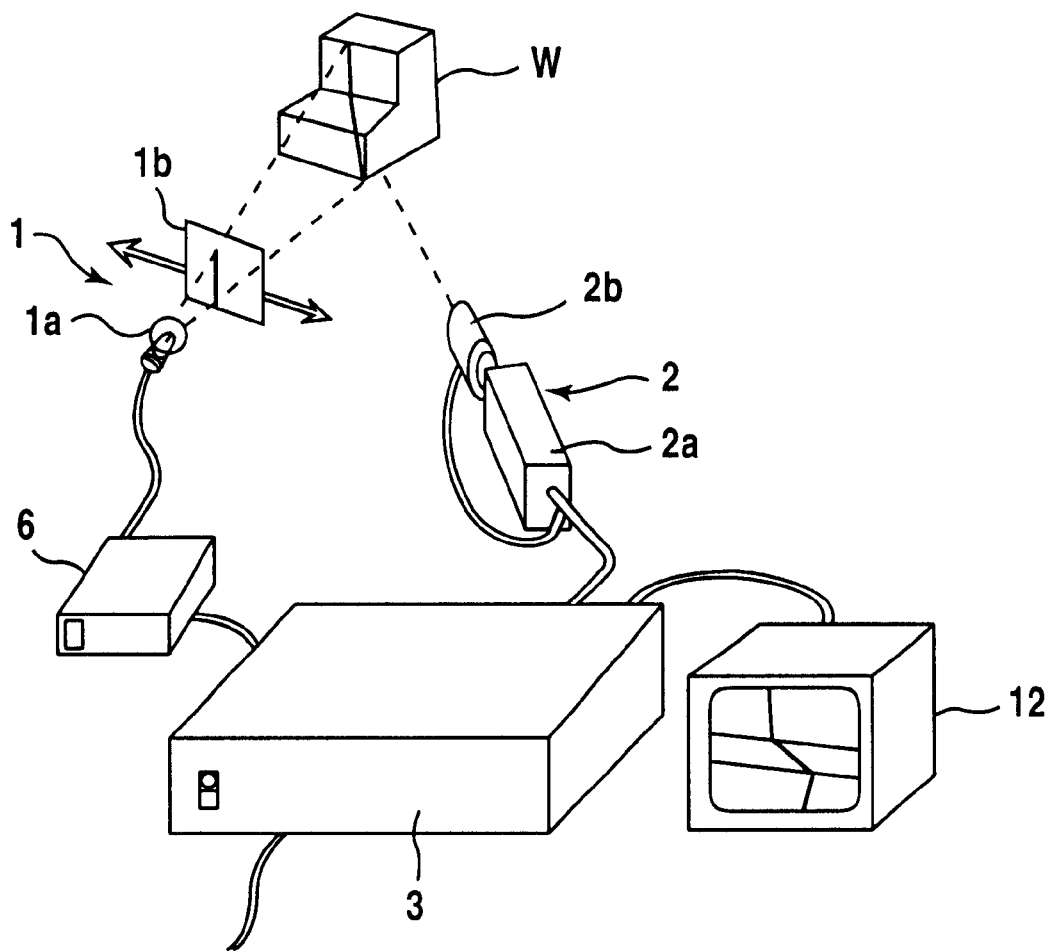
FIG. 1 is a schematic view showing a three dimensional configuration measuring system constructed according to a first embodiment.

Referring now to the drawings, there will be explained preferred embodiments of an image recognition system using the light-section method according to the invention.

(First Embodiment)

Figure 2:
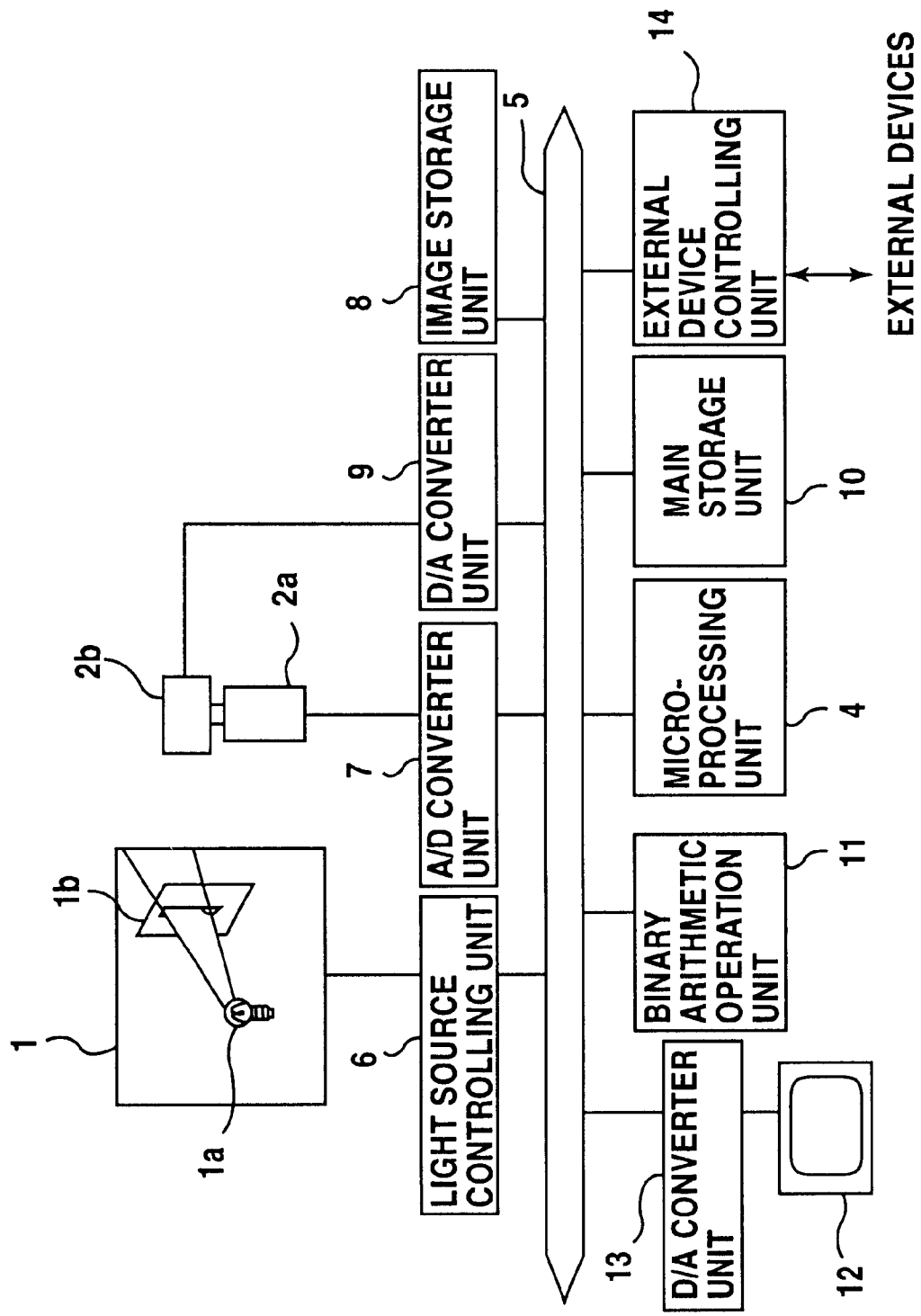
FIG. 2 is a block diagram of the three dimensional configuration measuring system constructed according to the first embodiment.

FIG. 1 schematically, diagrammatically shows the structure of a three dimensional configuration measuring system constructed according to a first embodiment of the invention and FIG. 2 shows, in block form, the same system.

The three dimensional configuration measuring system of this embodiment includes a slit light source 1 serving as the light projector means for projecting a slit light (linear light) onto a surface of a workpiece W that is an object to be measured. The system also includes a television camera 2 serving as the image pickup means for picking up the image of a bright portion that is formed on the surface of the workpiece W by the slit light source 1. The slit light source 1 comprises a spot light source 1a for generating a laser beam, a slit mask 1b and a slit scan mechanism (not shown). The spot light source 1a is controlled by a light source controlling unit 6 to be turned ON or OFF in response to a signal which has been released from a micro-processing unit (MPU) 4 in an image processing unit 3 through a bus 5. The television camera 2 comprises an image pickup unit 2a and a lens system 2b having an automatic aperture control mechanism for adjusting the amount of light to be admitted to the image pickup unit 2a. A picture signal from the image pickup unit 2a enters into an image storage unit 8 within the image processing unit 3 by way of an A/D converter 7 and the bus 5. In response to an output signal which has been released from the micro-processing unit 4 through the bus 5 and a D/A converter 9, the automatic aperture control mechanism of the lens system 2b is controlled.

In addition to the above-described micro-processing unit 4 and image storage unit 8, the image processing unit 3 comprises a main storage unit 10; a binary arithmetic operation unit 11 for representing an image stored in the image storage unit 8 in a binary notation based on a preset threshold; a D/A converter 13 for converting an image picked up by the television camera 2 so as to be displayed on an external display device (monitor) 12; and an external device controlling unit 14 for controlling external devices such as robot arms and a result display unit.

In such a measuring system, the spot light source 1a is turned ON to project a slit light onto the surface of the workpiece W through the slit mask 1b and the bright portion formed on the surface of the workpiece W is picked up by the television camera 2, whereby the image of a cutting plane line formed when a slit light cuts the workpiece W in one image picking up operation can be obtained. While the direction in which the slit light is projected being changed piecemeal by scanning with the slit mask 1b, an image of the bright portion formed on the surface of the workpiece W is picked up with the television camera 2. The picked up image is then processed by the image processing unit 3 to obtain the three dimensional configuration of the workpiece W.

In the measuring system of the first embodiment, the television camera 2 has the automatic aperture control mechanism by which the amount of light admitted to the image pickup unit 2a can be always appropriately adjusted according to changes in the surface property of the workpiece W or in the environmental condition (illumination intensity) on the surface of the workpiece W, which contributes to an improved accuracy in thinning of the linear bright portion formed on the surface of the workpiece W. However, there has been found a time delay between the adjustment operation of the automatic aperture control mechanism and changes in the amount of admitted light, as seen from FIGS. 3 and 4.

Figure 3:
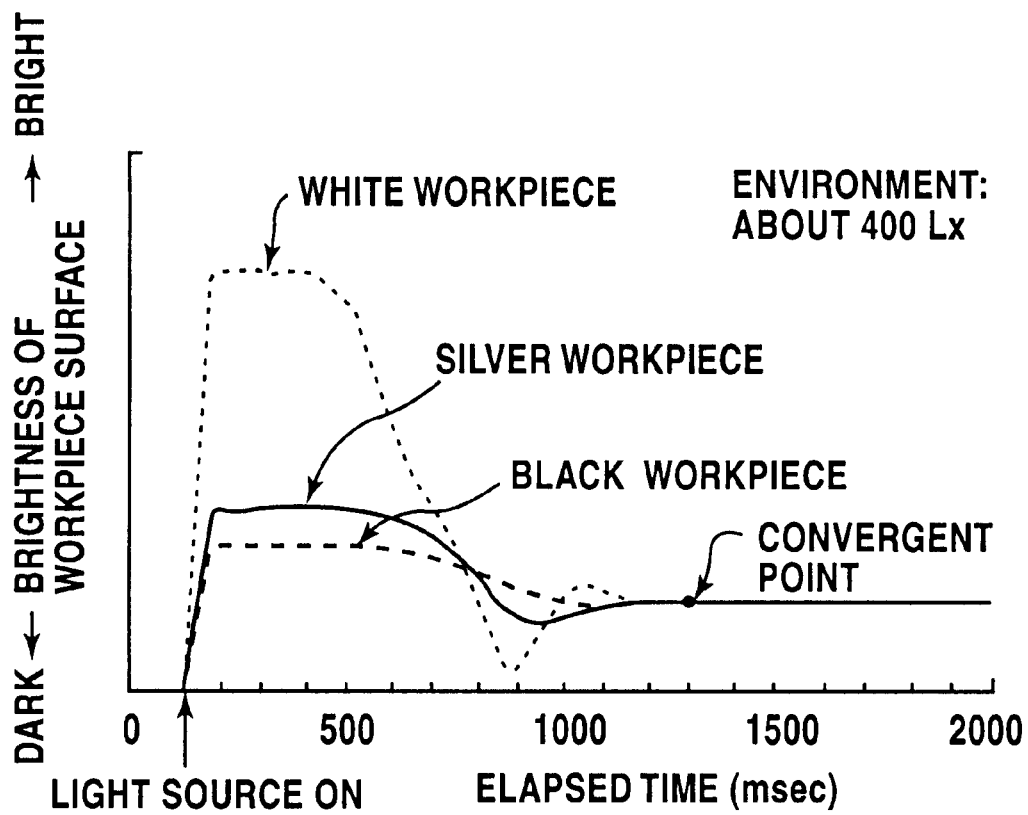
FIG. 3 shows TEST RESULT (1) relating to the operation of an automatic aperture control mechanism.
Figure 4:
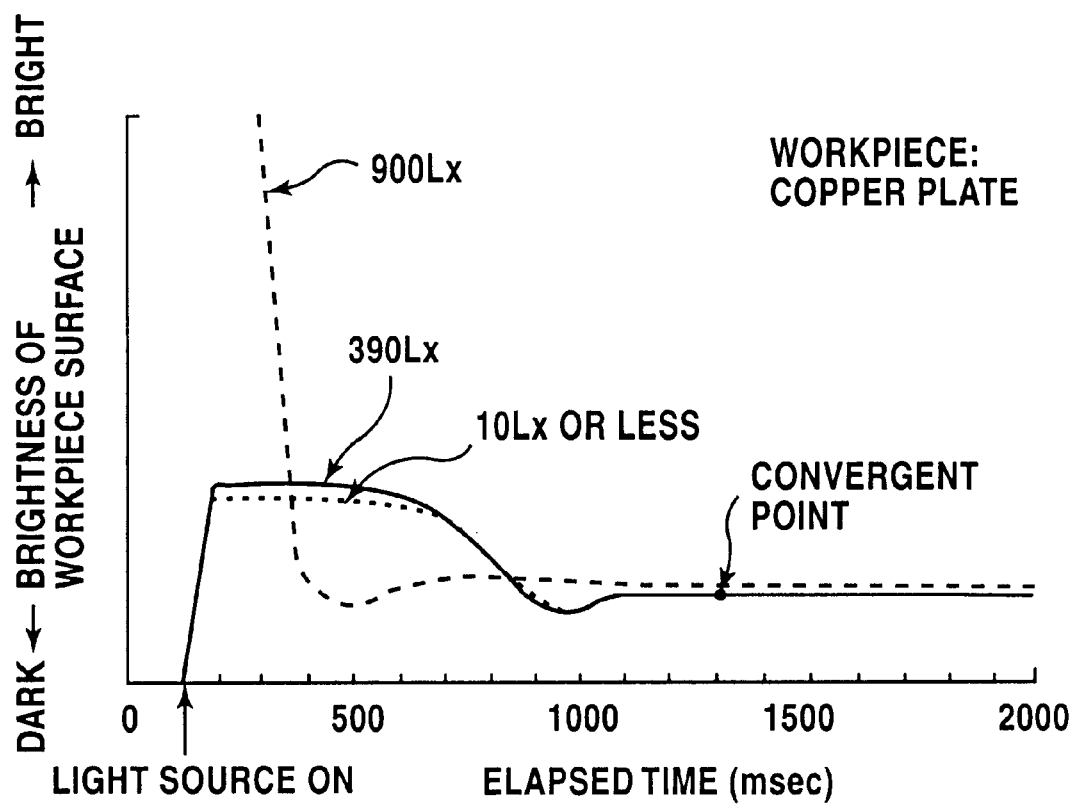
FIG. 4 shows TEST RESULT (2) relating to the operation of the automatic aperture control mechanism.

FIG. 3 shows a result of a test in which the operation of the automatic aperture control mechanism was checked in a certain environment (illumination intensity=about 400Lx), using white, silver and black workpiece samples having different surface properties, in other words, different coefficients of reflection to a slit light projected to the surfaces. FIG. 4 shows a result of another test for checking the operation of the automatic aperture control mechanism in different surface environments (illumination intensities of 900Lx, 390Lx and no more than 10Lx), using the same workpiece (steel plate).

To compensate for the delay, the following measure may be taken. The same tests as those conducted to obtain the results shown in FIGS. 3, 4 are conducted beforehand under desired workpiece and environmental conditions and the longest delay in the convergence of light is stored as a standard delay time in the main storage unit 10. In the measuring operation, the image pickup operation of the television camera 2 is set behind turning ON of the slit light source 1 by the length of time equal to the stored standard delay time. With this arrangement, stable images can be always stored in the image storage unit 8 even if workpiece and/or environmental conditions vary.

Figure 5:
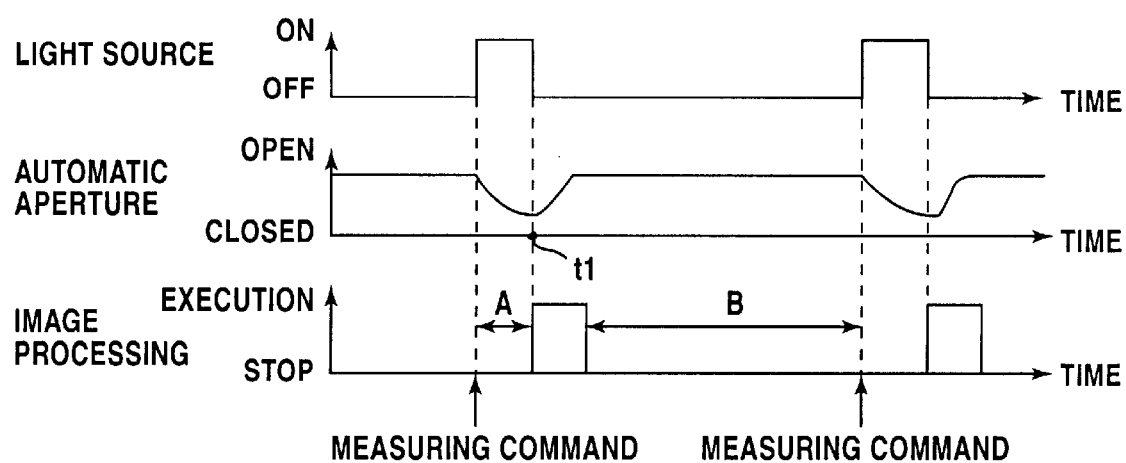
FIG. 5 is a conceptual diagram of a technique according to the first embodiment.

FIG. 5 is a time chart showing the time relation between the turning ON and OFF of the slit light source 1, aperture adjustment by the automatic aperture control mechanism and the execution of the operation of the image processing unit 3, according to the first embodiment. As seen from FIG. 5, upon release of a measuring command, the slit light source 1 is turned ON to allow picking up of an image, and at the same time, aperture adjustment is started by the automatic aperture control mechanism. Just after converging point $t_1$ at which the automatic aperture control mechanism has converged light, an image is picked up by the image pickup unit 2a to be stored in the image storage unit 8, and according to this image, the image processing unit 3 executes image processing. As soon as image picking up is completed, the slit light source 1 is turned OFF. It should be noted that "A" denotes the delay between the release of a measuring command and the execution of processing by the image processing unit 3 and "B" denotes a time interval between two successive measurements.

The three dimensional configuration measuring system of the first embodiment is provided with the automatic aperture control mechanism for adjusting the amount of admitted light and therefore it is no longer necessary to fix not only aperture settings but also object conditions and illumination intensity, which leads to improved versatility. Further, the slit light source 1 does not need to project light at all times but may be turned ON after issuing a measuring command until light convergence by the automatic aperture control mechanism. In other words, the slit light source 1 can be switched OFF at least during the time interval between two successive measurements, which prevents shortening of the service life of the slit light source 1. In addition, in cases where a laser is used as the light source, a light shielding device or the like used for protection for operators can be simplified.

(Second Embodiment)

While an image to be processed is picked up after waiting until light convergence by the automatic aperture control mechanism is completed in the first embodiment, the waiting time can be reduced by the arrangement of the second embodiment. Since the system shown in FIGS. 1, 2 is capable of observing the progress of the operation of the automatic aperture control mechanism, the second embodiment is arranged such that, after the slit light source 1 is turned ON in response to a measuring command, the light converging operation of the automatic aperture control mechanism is continuously observed. When it is determined that a state equivalent to light convergence has been established, an image to be processed for obtaining final data is obtained. With this arrangement, the waiting time for the image processing unit 3 until it executes image processing can be reduced. Next, the process of the second embodiment will be explained with reference to the conceptual diagram of FIG. 6 and the flow chart of FIG. 7.

S1: The following preset values are read.

(1) A threshold to be used in the binary arithmetic operation of the binary arithmetic operation unit 11.

(2) The number of white picture elements N in the binary image obtained at the time of light convergence by the automatic aperture control mechanism (Note that the number of white picture elements is representative of the brightness of an image).

(3) Allowable tolerances ±δ for the number of white picture elements N in the binary image at the time of light convergence.

(4) Waiting time $t_w$ sufficient for the automatic aperture control mechanism to cause light convergence.

S2 to S4: Upon release of a measuring command, the timer t for registering elapsed time is reset (t=0), and then the slit light source 1 is turned ON.

Figure 6:
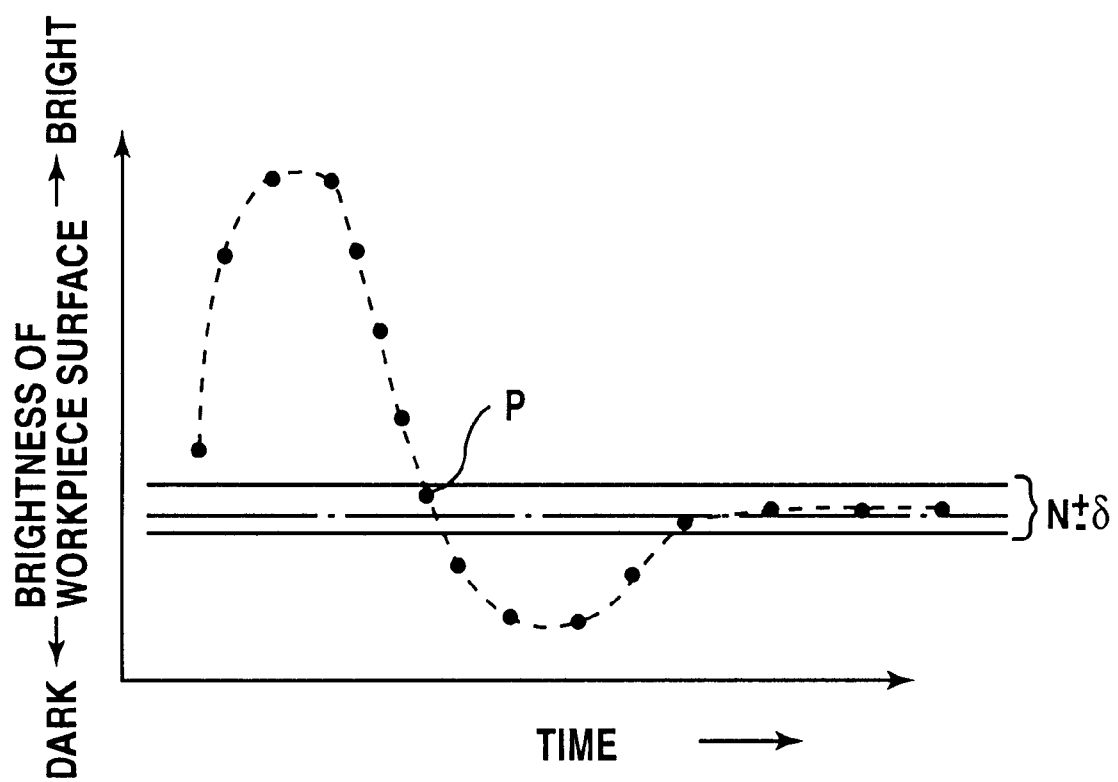
FIG. 6 is a conceptual diagram of a technique according to a second embodiment.
Figure 7:
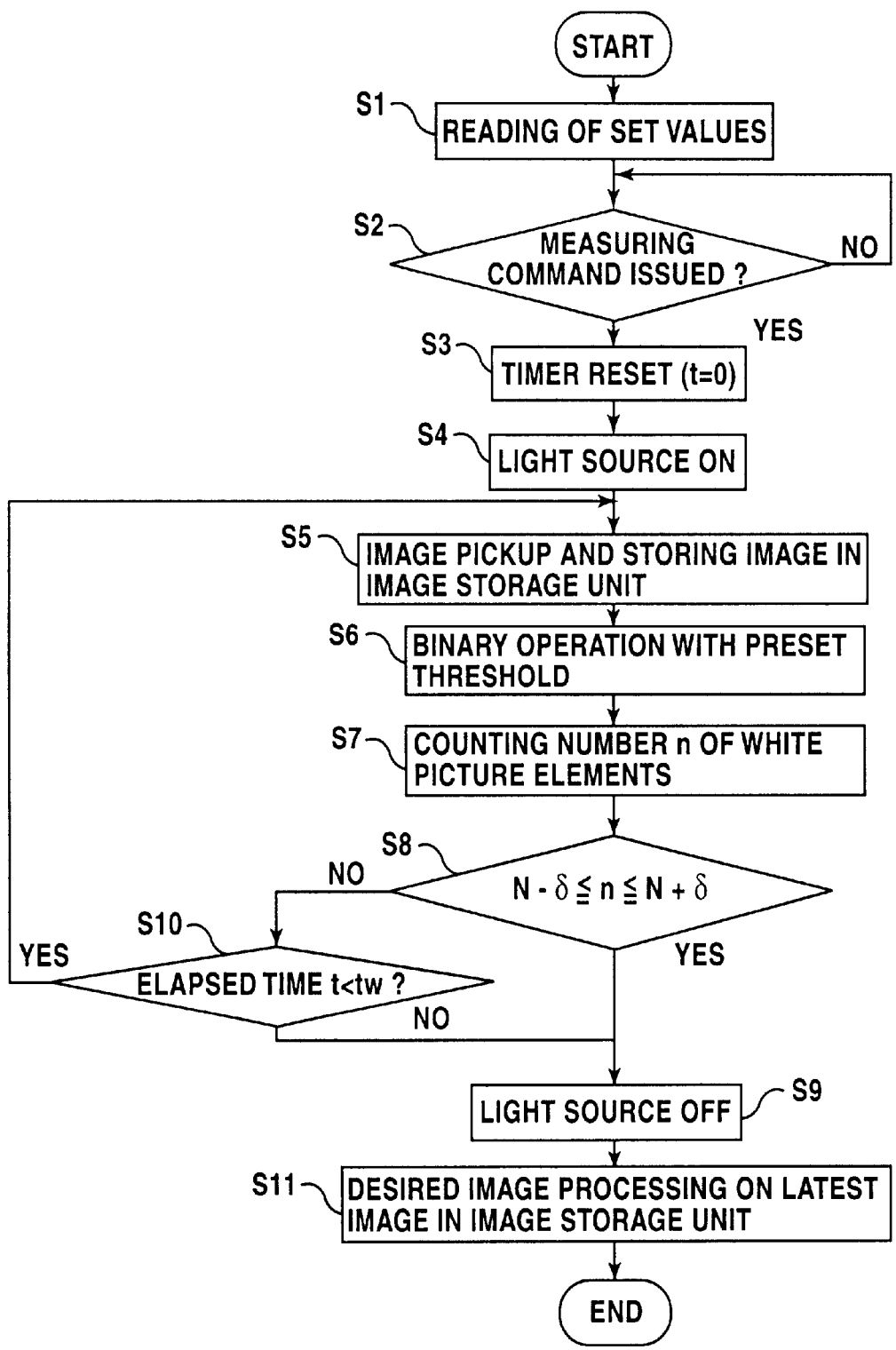
FIG. 7 is a flow chart of a process performed according to the second embodiment.

S5 to S7: The image of a bright line formed on the surface of the workpiece W is successively picked up by the television camera 2 and stored in the image storage unit 8 of the image processing unit 3. Then, the binary arithmetic operation unit 11 converts each stored image into binary digits, using the preset threshold. The number of white picture elements (bright picture elements) n in the binary image picked up at each time point is counted. Each point shown in FIG. 6 represents the number of white picture elements n in the image picked up at each time point. The broken line in FIG. 6 represents the progress of the operation of the automatic aperture control mechanism.

S8 to S10: It is determined if the following equation holds, in order to determine whether or not the number of white picture elements n falls within the range of N±δ where N denotes the number of white picture elements N at the time of light convergence by the automatic aperture control mechanism.

$$N-\delta \leq n \leq N+\delta$$

If this equation holds, in other words, if the number of white picture elements n falls within the range N±δ, picking up of a further image is not necessary and therefore the slit light source 1 is turned OFF. On the other hand, if this equation does not hold, it is then determined in the next step whether the elapsed time t reaches the waiting time $t_w$. If the elapsed time t is below the waiting time $t_w$, the program returns to Step S5 to continue picking up of an image. If the elapsed time t has reached the waiting time $t_w$, it is then determined the automatic aperture control mechanism has converged light, so that the slit light source 1 is turned OFF.

S11: The specified image processing is performed on the latest image (the image picked up at the time of switching OFF of the slit light source 1) stored in the image storage unit 8 and then the flow is ended.

According to the second embodiment, since the image (the image picked up at point P of FIG. 6) having white picture elements the number of which falls within the range N±δ is used in image processing, image processing can start when a state equivalent to light convergence has been established, without waiting until light convergence is accomplished by the automatic aperture control mechanism and therefore the waiting time for the image processing unit 3 until it executes processing can be reduced.

(Third Embodiment)

When there is a considerable difference in luminous energy between the input images picked up before and after the actuation of the slit light source 1, a large action is required for setting the aperture. In general, the time required for light convergence by the automatic aperture control mechanism increases, as the above aperture setting action becomes larger. Practically, in successive measurements, workpiece and environmental conditions seldom change abruptly. Taking this fact into account, the third embodiment is designed as follows. The operating position of the automatic aperture control mechanism at the process-image pickup point (i.e., at the time the image to be processed is picked up) in the preceding measurement is reserved. During the time interval between the two successive measurements (i.e., the waiting time for the next measurement), the automatic aperture control mechanism is kept at the above operating position to hold the preceding aperture setting. When a series of image picking up starts for the next measurement, the automatic aperture control mechanism is released from the preceding operating position. With this arrangement, the operating amount of the automatic aperture control mechanism is lessened thereby making unnecessary or extremely reducing the waiting time for the image processing unit 3 until it executes processing. Next, the process of the third embodiment will be described with reference to the conceptual diagram of FIG. 8 and the flow chart of FIG. 9.

T1: The following preset values are read.
(1) Waiting time $t_1$ after turning ON of the slit light source in cases where workpiece and environmental conditions do not vary to a considerable extent.
(2) Waiting time $t_2$ sufficient for the automatic aperture control mechanism to converge light in cases where workpiece or environmental conditions considerably vary.

Note that the waiting time $t_1$ is a very short time period set for accommodating a minor change in the environmental condition (i.e., ambient light intensity) which occurs between two successive measurements.

T2 to T5: A flag F is set, indicating that there has occurred a significant change in workpiece or environmental conditions (e.g., set up of the system and workpiece replacement). Then, upon release of a measuring command, the slit light source 1 is turned ON and the automatic aperture control system is released from the preceding operating position.

T6 to T9: If the flag F is set (F=1), it means that there has been a significant change in environment. Therefore, after the preset waiting time $t_2$ has elapsed, in other words, after waiting until the automatic aperture control mechanism converges light, the television camera 2 picks up an image of the bright line on the surface of the workpiece W to store in the image storage unit 8 of the image processing unit 3. On the other hand, if the flag F is not set (F=0), it means that there has been no significant change in environment. Therefore, after the preset short waiting time $t_1$ has elapsed, the television camera 2 picks up an image of the bright line on the surface of the workpiece W to store in the image storage unit 8 of the image processing unit 3.

T10 to T11: After the automatic aperture control mechanism is kept at the operating position corresponding to the present process-image pickup point, the slit light source 1 is turned OFF.

T12 to T13: The flag is put down (F=0), the specified image processing is performed on the latest image (the image picked up when the slit light source 1 is turned OFF) stored in the image storage unit 8.

T14 to T16: If measurement has not been completed, it is then determined from a signal sent from outside whether or not there has been a change in workpiece or environmental conditions. If it is determined that no change has occurred in the conditions, the program returns to Step T3 and waits for the next measuring command. If it is judged a change has occurred in the conditions, the flag F is set and the program returns to step T3 to wait for the next measuring command. If measurement has been completed, the flow is ended.

Figure 8:
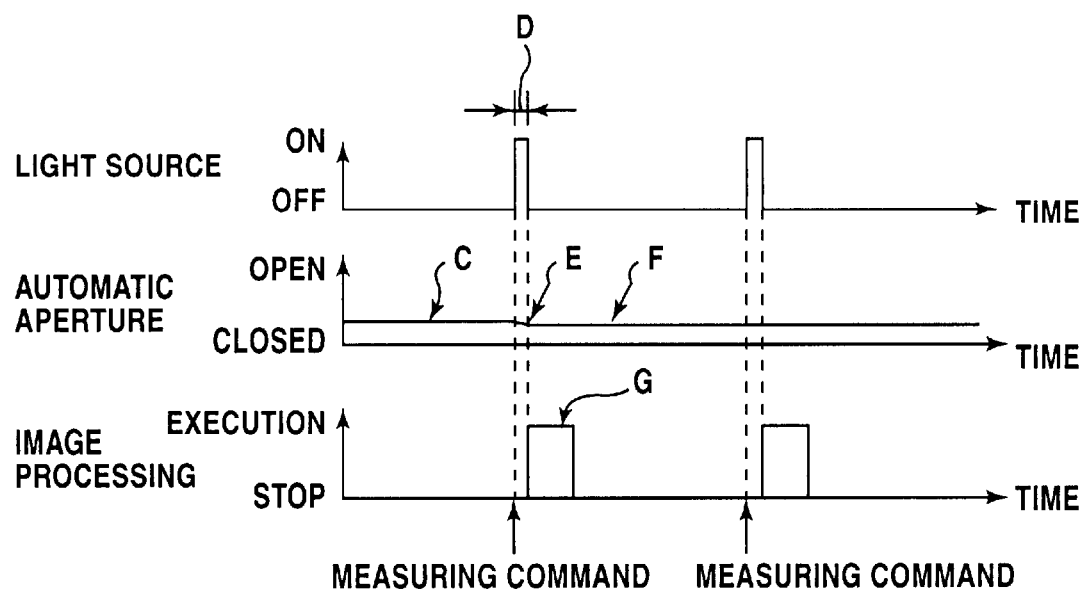
FIG. 8 is a conceptual diagram of a technique according to a third embodiment.
Figure 9:
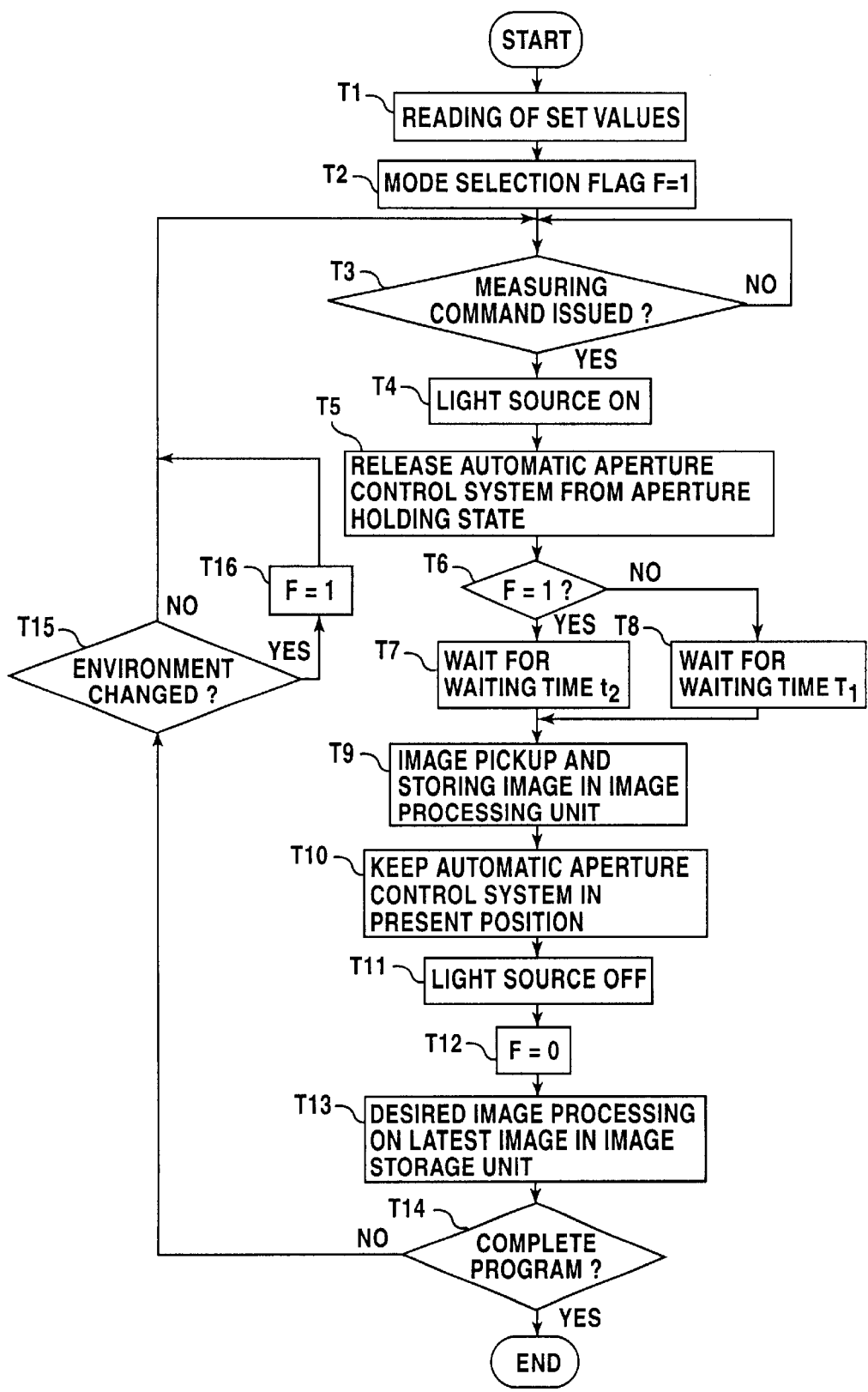
FIG. 9 is a flow chart of a process performed according to the third embodiment.

According to the third embodiment, as shown in FIG. 8, the operating position of the automatic aperture control mechanism at the preceding process-image pickup point is maintained (this process is indicated by C), and automatic aperture adjustment is executed (this process is indicated by E) for the period of time D which is the actuating time of the slit light source 1, this actuating time being given by the sum of the waiting time $t_2$ and the time required for storing a picked-up image in the image storage unit (in practice, image storage is done in an instant). Then, the automatic aperture control mechanism is kept in the operating position at which the aperture is set at the value just before the slit light source 1 is turned OFF (this process is indicated by F). During this time, image processing is executed with the above aperture value set just before turning OFF of the slit light source 1 (this process is indicated by G).

According to the third embodiment, the automatic aperture control mechanism is kept in the operating position corresponding to the process-image pickup point in the preceding measurement and the control mechanism is released from this position upon start of a series of image picking up operations in the next measurement. With this arrangement, the operating amount of the automatic aperture control mechanism can be minimized, thereby extremely reducing the waiting time for the image processing unit 3 until it starts execution of processing.

The means for keeping the automatic aperture control mechanism at an operating position may or may not include an automatic closing mechanism (for completely closing the diaphragm aperture automatically upon cutting off of the actuating power source). Depending on whether or not the automatic closing mechanism is provided, either of the following processes will be taken.

(1) Where the automatic closing mechanism is not provided

Figure 10:
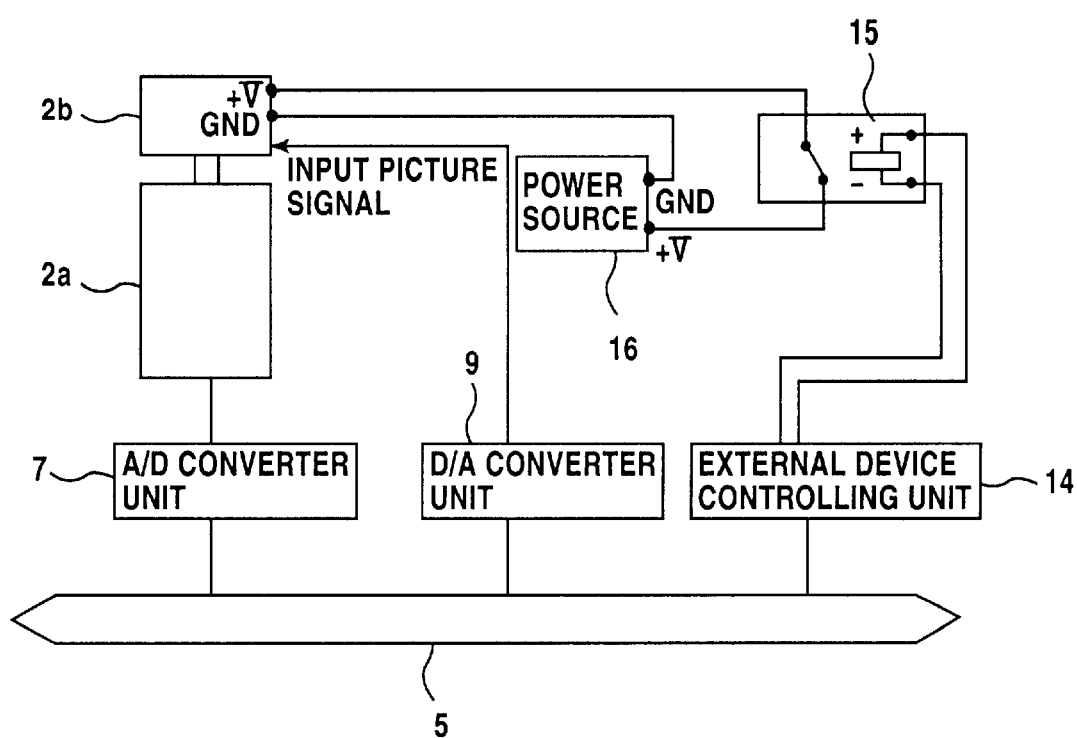
FIG. 10 illustrates an example of methods for keeping the operating position of the automatic aperture control system.

In this case, there may be arranged a mechanism as shown in FIG. 10 in which, in response to a signal from the external device controlling unit 14 of the image processing unit 3, a relay 15 is actuated to cut off the power source 16 for the lens system 2b including the automatic aperture control mechanism, whereby the automatic aperture control mechanism is kept at an operating position.

(2) Where the automatic closing mechanism is provided

Figure 11:
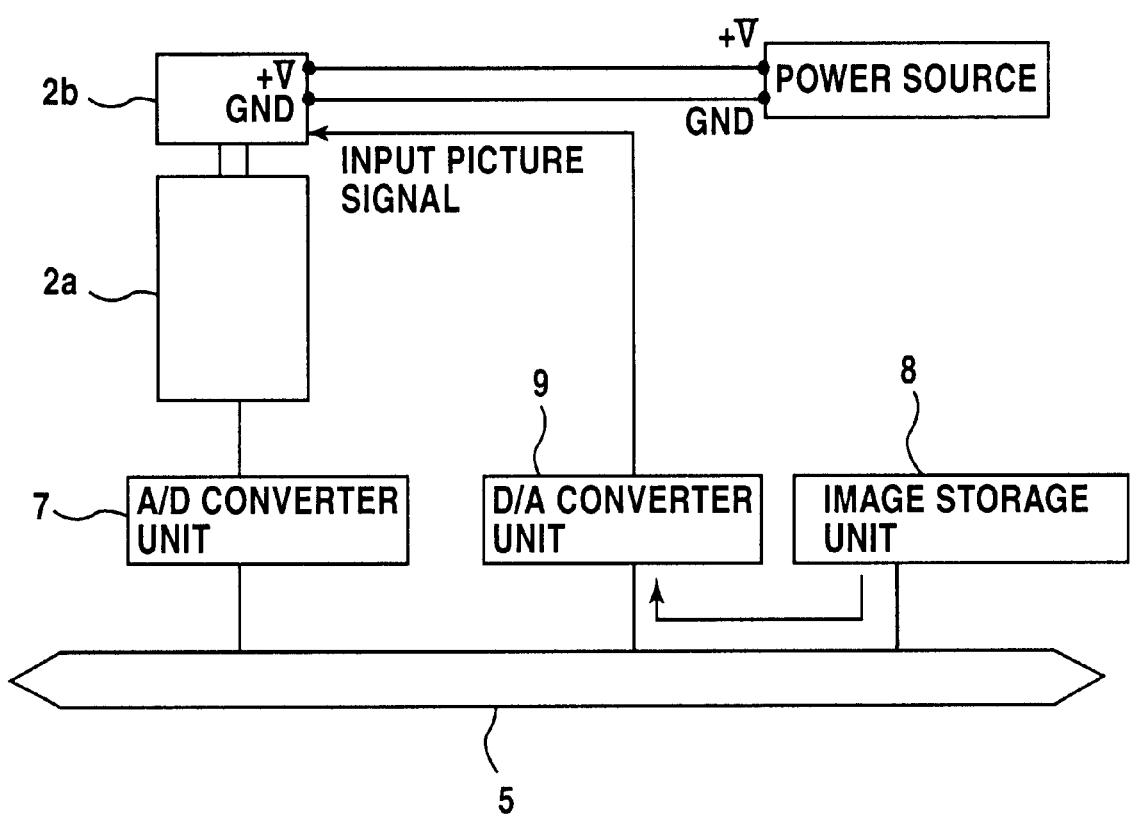
FIG. 11 illustrates another example of methods for keeping the operating position of the automatic aperture control system.

In this case, there may be arranged a mechanism as shown in FIG. 11, which stores a signal input to the automatic aperture control mechanism when it is in the desired operating position and continuously sends this signal to the automatic aperture control mechanism. More concretely, many automatic aperture control mechanisms use picture signals as input signals and ordinary image processing units have the function of keeping an image input at a certain point and outputting this image to, for example, the external display device (monitor) 12 as a picture signal. Accordingly, the image storage unit 8 can store the image of the workpiece at the point corresponding to the desired operating position at which the automatic aperture control mechanism is to be kept. Then, the image storage unit 8 continuously outputs a picture signal indicative of this image to the automatic aperture control mechanism during the time period for keeping the automatic aperture control mechanism at the desired operating position.

In cases where the slit light source 1 employed in the above embodiments is designed to emit a light with a single wavelength like a laser, it is desirable to provide the front rim of the television camera 2 serving as the image pickup means, with an attenuation filter (transmission filter) having a pass band centered at the single wavelength of the light emitted by the light source. This excludes the effects of environment and, in consequence, enables an image recognition system with high accuracy.

What is claimed is:

1. An image recognition system using a light-section method, in which a linear light is projected onto an object to be measured, to form a light image on the surface of the object and the light image is then picked up to obtain three dimensional data associated with the object, the system comprising:

(a) light projector means controlled to be turned ON and OFF to intermittently project a linear light onto the object;

(b) image pickup means for processing an image of the object onto which a linear light has been projected by the light projector means, the image pickup means including an automatic aperture control mechanism for automatically adjusting a diaphragm aperture according to a picked-up image;

(c) image processing means for processing an image picked up by the image pickup means to obtain three-dimensional configuration data on the object; and (d) controller means for controlling an ON/OFF state of the light projector means such that the light projector means is put in the ON state to project a linear light onto the object between a time when a measuring command is issued and a time just after light has been converged by the automatic aperture control mechanism of the image pickup means, and controlling the image processing means to process an image picked up by the image pickup means just after the convergence of light by the automatic aperture control mechanism, so as to obtain three dimensional configuration data on the object.

2. An image recognition system using the light-section method according to claim 1, the system further comprising aperture holding means for holding the diaphragm aperture at a value set upon completion of light convergence performed by the automatic aperture control mechanism of the image pickup means, from the completion of light convergence until the next release of a measuring control.

3. An image recognition system using the light-section method according to claim 2, wherein said aperture holding means is designed to cut off an actuating power source for the automatic aperture control mechanism thereby stopping its aperture adjustment operation to hold the aperture at the value set upon completion of light convergence.

4. An image recognition system using the light-section method according to claim 2, wherein said aperture holding means includes an image storage unit for storing an image picked up by the image pickup means just after light convergence, at least until the next release of a measuring command, and said aperture holding means allows the automatic aperture control mechanism to perform aperture adjustment operation according to said image stored in the image storage unit to hold the aperture at the value set upon the completion of light convergence, until the next release of a measuring command.

5. An image recognition system using the light-section method according to any one of claims 1 to 4, wherein the light projector means projects a linear light generated by a single-wavelength light source onto the object and the image pickup means picks up an image of the object onto which the linear light has been projected, through an attenuation filter having a pass band centered at the single wavelength of the light generated by said light source.

6. An image recognition system using a light-section method, in which a linear light is projected onto an object to be measured, to form a light image on the surface of the object and the light image is then picked up to obtain three dimensional data associated with the object, the system comprising:

(a) light projector means controlled to be turned ON and OFF to intermittently project a linear light onto the object;

(b) image pickup means for processing an image of the object onto which a linear light has been projected by the light projector means, the image pickup means including an automated aperture control mechanism for automatically adjusting a diaphragm aperture according to a picked-up image;

(c) image processing means for processing an image picked up by the image pickup means to obtain three-dimensional configuration data on the object; and (d) controller means for controlling an ON/OFF state of the light projector means such that the light projector means is put in the ON state to project a linear light onto the object between a time when a measuring command is issued and a time just after a state equivalent to the convergence of light has been established, and controlling the image processing means to process an image picked up by the image pickup means just after the establishment of the state equivalent to the convergence of light, so as to obtain three dimensional configuration data on the object.

7. An image recognition system using the light-section method according to claim 6, the system further comprising aperture holding means for holding the diaphragm aperture at a value set upon establishment of the state equivalent to light convergence performed by the automatic aperture control mechanism of the image pickup means, from the establishment of the light-convergence-equivalent state until the next release of a measuring control.

8. An image recognition system using the light-section method according to claim 7, wherein said aperture holding means is designed to cut off an actuating power source for the automatic aperture control mechanism thereby stopping its aperture adjustment operation to hold the aperture at the value set upon establishment of the light-convergence-equivalent state.

9. An image recognition system using the light-section method according to claim 7, wherein said aperture holding means includes an image storage unit for storing an image picked up by the image pickup means just after establishment of the light-convergence-equivalent state, at least until the next release of a measuring command, and said aperture holding means allows the automatic aperture control mechanism to perform aperture adjustment operation according to said image stored in the image storage unit to hold the aperture at the value set upon the establishment of the light-convergence-equivalent state, until the next release of a measuring command.

10. An image recognition system using the light-section method according to any one of claims 6–9, wherein the light projector means projects a linear light generated by a single-wavelength light source onto the object and the image pickup means picks up an image of the object onto which the linear light has been projected, through an attenuation filter having a pass band centered at the single wavelength of the light generated by said light source.

* * * * *